United States Patent [19]

Salentine

[11] Patent Number: 4,640,827

[45] Date of Patent: Feb. 3, 1987

[54] TRIHYDRATED POTASSIUM TRIBORATE AND PROCESS FOR REACTING TWO BORATES IN THE SOLID STATE

[75] Inventor: Christopher G. Salentine, Mill Valley, Calif.

[73] Assignee: Chevron Research Company, San Francisco, Calif.

[21] Appl. No.: 783,283

[22] Filed: Sep. 30, 1985

[51] Int. Cl.[4] ............................................. C01B 35/10
[52] U.S. Cl. ..................................... 423/279; 423/277
[58] Field of Search ................................ 423/277, 279

[56] References Cited

U.S. PATENT DOCUMENTS

| 4,196,177 | 4/1980 | Sallay | 423/279 |
| 4,382,025 | 5/1983 | Sallay | 252/607 |
| 4,504,546 | 3/1985 | Sallay | 428/375 |
| 4,514,326 | 4/1985 | Sallay | 252/602 |

OTHER PUBLICATIONS

C & EN, Feb. 20, 1984, pp. 36-37, "Methanol is Key to Direct Ore Conversion to Pentaborate", Ward Worthy, Chicago.

*Primary Examiner*—John Doll
*Assistant Examiner*—Jackson Leeds
*Attorney, Agent, or Firm*—S. R. LaPaglia; R. C. Gaffney; J. J. DeYoung

[57] ABSTRACT

Disclosed is the compound trihydrated potassium triborate having the following chemical formula: $KB_3O_5 \cdot 3H_2O$. Also disclosed is a process for the production of trihydrated potassium triborate by reacting potassium pentaborate tetrahydrate with either dipotassium tetraborate tetrahydrate or with dipotassium pentaborate pentahydrate by contacting the two solid reactants under reaction conditions including an amount of water sufficient to cause reaction and insufficient to dissolve the two reactant solids. The new trihydrated potassium triborate may also be prepared by treating dipotassium pentaborate pentahydrate with water under the same reaction conditions.

11 Claims, No Drawings

TRIHYDRATED POTASSIUM TRIBORATE AND PROCESS FOR REACTING TWO BORATES IN THE SOLID STATE

BACKGROUND OF THE INVENTION

The invention relates to a new alkali metal borate compound, specifically, trihydrated potassium triborate. The invention also relates to a process for the production of trihydrated potassium triborate.

Solid borates are well known in the art and have many uses. Typical uses include fluxes, buffers, flame retardants and preservatives.

Pentaborates are also known in the art. See, for example, Chem. and Engr. News, Feb. 20, 1984, "Methanol Is Key to Direct Ore Conversion to Pentaborate".

SUMMARY OF THE INVENTION

Claimed is the compound trihydrated potassium triborate having the following chemical formula: $KB_3O_5.3H_2O$. Also claimed is a process for the production of trihydrated potassium triborate by reacting potassium pentaborate tetrahydrate with either dipotassium tetraborate tetrahydrate or with dipotassium pentaborate pentahydrate by contacting the two solid reactants under reaction conditions including an amount of water sufficient to cause reaction and insufficient to dissolve the two reactant solids. The new trihydrated potassium triborate may also be prepared by treating dipotassium pentaborate pentahydrate with water under the same reaction conditions.

DETAILED DESCRIPTION OF THE INVENTION

It has been discovered that two stable, readily available potassium borates, when contacted as solids in the presence of water, produce a new third species which heretofore has not been known in the art. The new trihydrated potassium triborate is formed by contacting in the solid state potassium pentaborate tetrahydrate with dipotassium tetraborate tetrahydrate in the presence of water sufficient to cause reaction but insufficient to dissolve either of the reactant solids. The chemical reaction can be represented as follows:

$$KB_5O_8.4H_2O + K_2B_4O_7.4H_2O + H_2O \rightarrow 3KB_3O_5.3H_2O.$$

The reactants potassium pentaborate tetrahydrate and dipotassium tetraborate tetrahydrate are available commercially.

Alternatively, $KB_3O_5.3H_2O$ can be made from potassium pentaborate tetrahydrate and dipotassium pentaborate pentahydrate according to the following reaction:

$$KB_5O_8.4H_2O + 2K_2B_5O_8(OH).2H_2O + 6H_2O \rightarrow 5KB_3O_5.3H_2O.$$

The reaction conditions are the same as described above. The preparation of dipotassium pentaborate pentahydrate has been described previously, see for example, C. G. Salentine "Inorganic Chem.", vol. 22, page 3920 (1983).

$KB_3O_5.3H_2O$ can also be made, though not in a pure state, by reacting dipotassium pentaborate pentahydrate with water as described above. This reaction is as follows:

$$2K_2B_5O_8(OH).2H_2O + 5H_2O \rightarrow 2KB_3O_5.3H_2O + K_2B_4O_7.4H_2O.$$

These latter two alternate synthetic methods are theorized to be based on the first method, that is, the $K_2B_5$ salt initially decomposes to a mixture of the $KB_5$ and $K_2B_4$ salts, which then react with each other in the presence of moisture to produce $KB_3O_5.3H_2O$. The solid $K_2B_5$ salt is known to be a metastable phase which disproportionates to $KB_5$ and $K_2B_4$ upon contact with water.

The preferred method is the reaction of potassium pentaborate tetrahydrate and dipotassium tetraborate tetrahydrate as described above.

It is critical to the production of the new compound of the present invention that the reactants remain at least partially in the solid state. It has been surprisingly found that if either of the solids is dissolved in water, that the new compound is not formed. It is preferred to carry out the process of the present invention in the presence of sufficient water to cause reaction of the two solids but insufficient water to dissolve either of the two solids. Generally, sufficient water to cause reaction will be the atmospheric moisture at more than a 60% relative humidity. It is particularly preferred to carry out the reaction of the two solids in an atmosphere having a relative humidity in the range of 70 to 100% and more preferably, in the range of 80 to 100%.

Temperature is important with regard to the fact that solubility of a solid generally increases with temperature. Generally, the reaction will be carried out in the range of 35° to 150° F. and preferably 50° to 100° F. Reaction rates are slow and sufficient time must be allowed for complete reaction. In general reaction times range from 10 to 100 hours or more, preferably 50 to 75 hours.

The molecular structure of $KB_3O_5.3H_2O$ was determined by a single-crystal x-ray diffraction analysis ($R_1=0.029$). The compound is monoclinic, space group C2/c, with a=15.540(5) Å, b=6.821(2) Å, c=14.273(4) Å, beta=104.44(2), z=8. The structure contains an isolated $B_3O_3(OH)_4^-$ anion formed from a $B_3O_3$ ring, and is thus alternatively represented as $KB_3O_3(OH)_4.H_2O$.

The new compound of the present invention has many uses. In general it may be used as a replacement for either of the two borates used in the preferred preparation process. For example it may be used in adhesives, in welding fluxes and as a nuclear poison. One preferred use is as a flame retardant.

The following examples are given illustrating various aspects of the present invention but are not considered as limiting the same.

EXAMPLE 1

A 1:1 mole mixture of solid $KB_5O_8.4H_2O$ and solid $K_2B_4O_7.4H_2O$ (29.3 mg $KB_5O_8.4H_2O$ + 30.6 mg $K_2B_4O_7.4H_2O$) was exposed to 50-60% relative humidity at 70° F. Analysis of the mixture after two months showed that no reaction had occurred.

EXAMPLE 2

The mixture of Example 1 was placed in a 100% humidity chamber at 70° F. After 72 hours, complete reaction had taken place and the solid analyzed as 100% $KB_3O_5.3H_2O$. The crystalline solid was analyzed using X-ray powder diffraction and infrared spectroscopy.

EXAMPLE 3

The mixture of Example 1 was treated with a small amount of water (about 0.3 g), insufficient to dissolve all the solid, and the water was allowed to evaporate slowly over a 72-hour period at 70° F. Analysis of the resulting solid showed it to be 100% $KB_3O_5.3H_2O$.

EXAMPLE 4

The mixture of Example 1 was treated with an amount of water (about 1.5 g) sufficient to dissolve all the solid, and the water was allowed to evaporate slowly over a 72-hour period at 70° F. No reaction took place.

Comparison of Examples 1, 2 and 3 illustrates that a sufficient amount of water must be used for reaction between the two solids to occur.

Comparison of Examples 3 and 4 illustrates that no reaction occurs if both of the solid reactants are dissolved.

EXAMPLE 5

A 1:2 mole mixture of solid $KB_5O_8.4H_2O$ and solid $K_2B_5O_8(OH).2H_2O$ (9.8 mg and 20.9 mg. respectively) was exposed to 100% humidity at 70° F. After 72 hours, complete reaction had taken place and the solid analyzed as 100% $KB_3O_5.3H_2O$.

Comparison of examples 2 and 5 shows that potassium pentaborate tetrahydrate may be reacted with either dipotassium tetraborate tetrahydrate or dipotassium pentaborate pentahydrate to produce $KB_3O_5.3H_2O$.

EXAMPLE 6

Solid $K_2B_5O_8(OH).2H_2O$ was exposed to 100% humidity at 70° F. After 72 hours, the solid analyzed as approximately 67% $KB_3O_5.3H_2O$ and 33% $K_2B_4O_7.4H_2O$.

This example illustrates an alternative method for producing the compound of this invention. this process is less preferred since the initial product contains about one-third by-product and two-thirds desired compound.

What is claimed is:

1. A trihydrated potassium triborate having the following chemical formula:

$$KB_3O_5.3H_2O$$

and wherein said triborate has the following X-ray diffraction parameters: a=15.540(5) Å, b=6.821(2) Å, c=14.273(4) Å and beta=104.44(2)° in the monoclinic space group C2/c.

2. A process for the production of a trihydrated potassium triborate having the following chemical formula:

$$KB_3O_5.3H_2O$$

comprising contacting as solids potassium pentaborate tetrahydrate with dipotassium tetraborate tetrahydrate or dipotassium pentaborate pentahydrate under reaction conditions, said reacting conditions including an atmosphere having more than a 60% relative humidity and a reaction temperature in the range of 35° to 150° F. and a reaction time from 10 to 100 hours or more and insufficient water to completely dissolve said potassium pentaborate, said dipotassium tetraborate, tetrahydrate or said dipotassium pentaborate pentahydrate.

3. The process of claim 2 wherein said solids are reacted in an atmosphere having a relative humidity in the range of 70 to 100%.

4. The process of claim 3 wherein said reaction is carried out in an atmosphere having a relative humidity in the range of 80 to 100%.

5. The process of claim 4 wherein said reaction is carried out in the temperature range of 50° to 100° F.

6. A process for the production of trihydrated potassium triborate having the following chemical formula:

$$KB_3O_5.3H_2O$$

comprising contacting under reaction conditions solid dipotassium pentaborate pentahydrate with water said reaction conditions including an atmosphere having more than a 60% relative humidity and a reaction temperature in the range of 35° to 150° F. and a reaction time from 10 to 100 hours or more and insufficient water to completely dissolve said dipotassium pentaborate pentahydrate.

7. The process of claim 6 wherein said dipotassium pentaborate pentahydrate is reacted in an atmosphere having a relative humidity in the range of 70 to 100%.

8. The process of claim 7 wherein said reaction is carried out in an atmosphere having a relative humidity in the range of 80 to 100%.

9. The process of claim 8 wherein said reaction is carried out in the temperature range of 50° to 100° F.

10. The process of claim 3 wherein said solids are potassium pentaborate tetrahydrate and dipotassium tetraborate tetrahydrate.

11. The process of claim 3 wherein said solids are potassium pentaborate tetrahydrate and dipotassium pentaborate pentahydrate.

* * * * *